United States Patent [19]
Eggebeen

[11] Patent Number: 5,104,058
[45] Date of Patent: Apr. 14, 1992

[54] TAPE GUIDANCE SYSTEM FOR BELT-DRIVEN CARTRIDGE

[75] Inventor: James A. Eggebeen, San Diego, Calif.

[73] Assignee: Gigatek Memory Systems, Inc., La Costa, Calif.

[21] Appl. No.: 572,891

[22] Filed: Aug. 27, 1990

[51] Int. Cl.⁵ ............................................. G11B 15/32
[52] U.S. Cl. .................................. 242/199; 242/192; 242/76
[58] Field of Search ............... 242/76, 192, 197, 198, 242/199, 200; 360/132; 226/196, 197

[56] References Cited

U.S. PATENT DOCUMENTS

| | | | |
|---|---|---|---|
| 3,226,651 | 10/1966 | Bryer | 242/76 X |
| 3,333,753 | 8/1967 | Streets | 226/197 X |
| 3,432,084 | 3/1969 | DenBussche | 226/197 |
| 3,692,255 | 9/1972 | Van Behren | 242/192 |
| 4,040,575 | 8/1977 | Ryan | 242/76 |
| 4,221,348 | 9/1980 | Moeller | 242/192 |
| 4,248,393 | 2/1981 | Moji | 242/192 |
| 4,324,372 | 4/1982 | Majicek et al. | 242/192 |
| 4,335,857 | 6/1982 | Pfost et al. | 242/76 X |
| 4,379,517 | 4/1983 | Miyakawa et al. | 242/76 X |
| 4,441,133 | 4/1984 | Ogawa et al. | 226/196 X |
| 4,457,473 | 7/1984 | Mroz et al. | 242/199 X |
| 4,466,564 | 8/1984 | Smith et al. | 242/192 X |
| 4,534,523 | 8/1985 | Zarr | 242/192 |
| 4,642,721 | 2/1987 | Georgens et al. | 242/192 X |
| 4,697,759 | 10/1987 | Henderson et al. | 242/192 X |

Primary Examiner—Daniel P. Stodola
Assistant Examiner—John P. Darling
Attorney, Agent, or Firm—Brown, Martin, Haller & McClain

[57] ABSTRACT

The tape guidance system includes at least three tape guidance surfaces, each of the tape guidance surfaces having at least one enlarged shoulder extending from the tape guidance surface toward the tape to bear upon an edge of the tape and provide a confinement force parallel to the plane of the tape in a direction transverse to the direction of the tape motion. Two adjacent tape guide surfaces have a close tolerance guide, with a distance between the shoulders being equal to or slightly greater than the width of the tape. The third tape guidance surface has a wide clearance such that if the tape is to contact the shoulder of the third guide, it must deviate from a straight line path. The tape has a tendency toward the shoulder of the third guide as a function of the perpendicularity of the tape guide to the plane of the tape. The tape path is such that if a tape is to contact the shoulder of the third guide it must contact alternature surfaces of the other two guides. The two adjacent guides, which are contacted either top-bottom or bottom-top represent the guides which span the location of engagement of the magnetic head.

4 Claims, 2 Drawing Sheets

TAPE GUIDANCE SYSTEM FOR BELT-DRIVEN CARTRIDGE

BACKGROUND OF THE INVENTION

I. Field of the Invention

The present invention relates to an improved tape guidance system.

II. Background Art

Computers which read and write data on magnetic tape require rapid acceleration and deceleration of the tape. The belt-driven tape cartridge disclosed in U.S. Pat. No. 3,692,255 (Von Behren) has been found best suited to meet this requirement, however, it is not without its limitations. The belt-driven tape cartridge, first marketed in 1972, was made to meet the density and speed requirements at that time. Since then, the ¼" wide (6.35 mm), 1 mil (0.025 mm) tape, driven at 30" (762 mm) per second, has become available in widths from 0.150" (3.81 mm) to 0.250" (6.35 mm), is as thin as 0.6 mil (0.015 mm) and may be driven at 120 or more inches (30479 mm) per second. Data densities have increased by nearly an order of magnitude. The high density of data on the tape is made possible by multiple independent, parallel tracks spaced across the width of the tape. The higher tape speeds and densities have introduced the possibility of the tape drifting up or down with respect to the tape head, causing head to datatrack misalignment.

Traditionally, transverse confinement is accomplished by the guides which have upper and lower shoulders which bear upon the upper and lower edges, respectively, of the tape to prevent the tape from wandering transversely from its intended path. This type of tape guidance, known as "opposed surface guidance", is adequate when the tape position need only be relatively loosely controlled, but is inadequate in the case where it is necessary to record and read a number of parallel adjacent tracks across the width of the tape.

The need for positive confinement of the tape in a direction transverse to tape motion and a proposed solution are disclosed in U.S. Pat. No. 4,534,523 (Zarr). The Zarr patent describes the use of at least three tape guidance surfaces wherein the shoulders of the tape guidance surfaces are arranged alternately along the tape path so that the shoulders of successive tape guidance surfaces bear against opposite edges of the tape, and where the planes containing the shoulders are spaced at a distance equal to or less than the width of the tape. Such a system, known as "alternate edge guidance", is subject to the flatness characteristics of the baseplate due to the requirement that a contact pattern of top-bottom-top, or bottom-top-bottom, be maintained. It is possible to have a cartridge manufactured where the tolerances are all nominal such that the tape guides can no longer provide alternate edge surface guidance, in which case the tracking accuracy of the guides are impaired.

It would be desirable to provide a tape guidance system which utilizes a tape's natural tendency to deviate from a true straight line which is not dependent on baseplate flatness and which does not introduce the risk of damage to the tape edge by attempting to run the tape through a tape guide which is narrower than the width of the tape. It is to this objective that the present invention is directed.

SUMMARY OF THE INVENTION

It is an advantage of the present invention to provide an improved tape guidance system which maintains a close tolerance tape guidance near the magnetic head-to-tape interface area.

In an exemplary embodiment, the tape guidance system includes at least three tape guidance surfaces, each of the tape guidance surfaces having at least one enlarged shoulder extending from the tape guidance surface toward the tape to bear upon an edge of the tape and provide a confinement force parallel to the plane of the tape in a direction transverse to the direction of the tape motion. Two adjacent tape guide surfaces are close tolerance guides, with the distance between the shoulders being equal to or slightly greater than the width of the tape. The third tape guidance surface has a wide clearance such that if the tape is to contact the shoulder of the third guide it must deviate from a straight line path. The tape has a tendency toward the shoulder of the third guide as a function of the perpendicularity of the tape guide to the reference plane, i.e., the plane of the tape when it is perfectly perpendicular to a flat baseplate. The tape path is such that if a tape is to contact the shoulder of the third guide it must contact alternate surfaces of the other two guides. The two adjacent close tolerance guides, which are contacted in a sequence of either top-bottom or bottom-top, span the location of engagement of the magnetic head. Because manufacturing tolerances virtually guarantee that a tape guide will not be perfectly perpendicular to the baseplate, the tape has a preference to run on the shoulder of the third guide that creates the longest tape path which then forces the tape to bear against the shoulders of the other guides in the above sequence.

The tape is always in contact with one shoulder of each tape guide, and due to the geometries of the design, the tape will always remain in contact with the same shoulders. The tape is therefore constrained against relative motion transverse to the tape travel direction due to its contact with the tape guide shoulders.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENT

Figure 1:
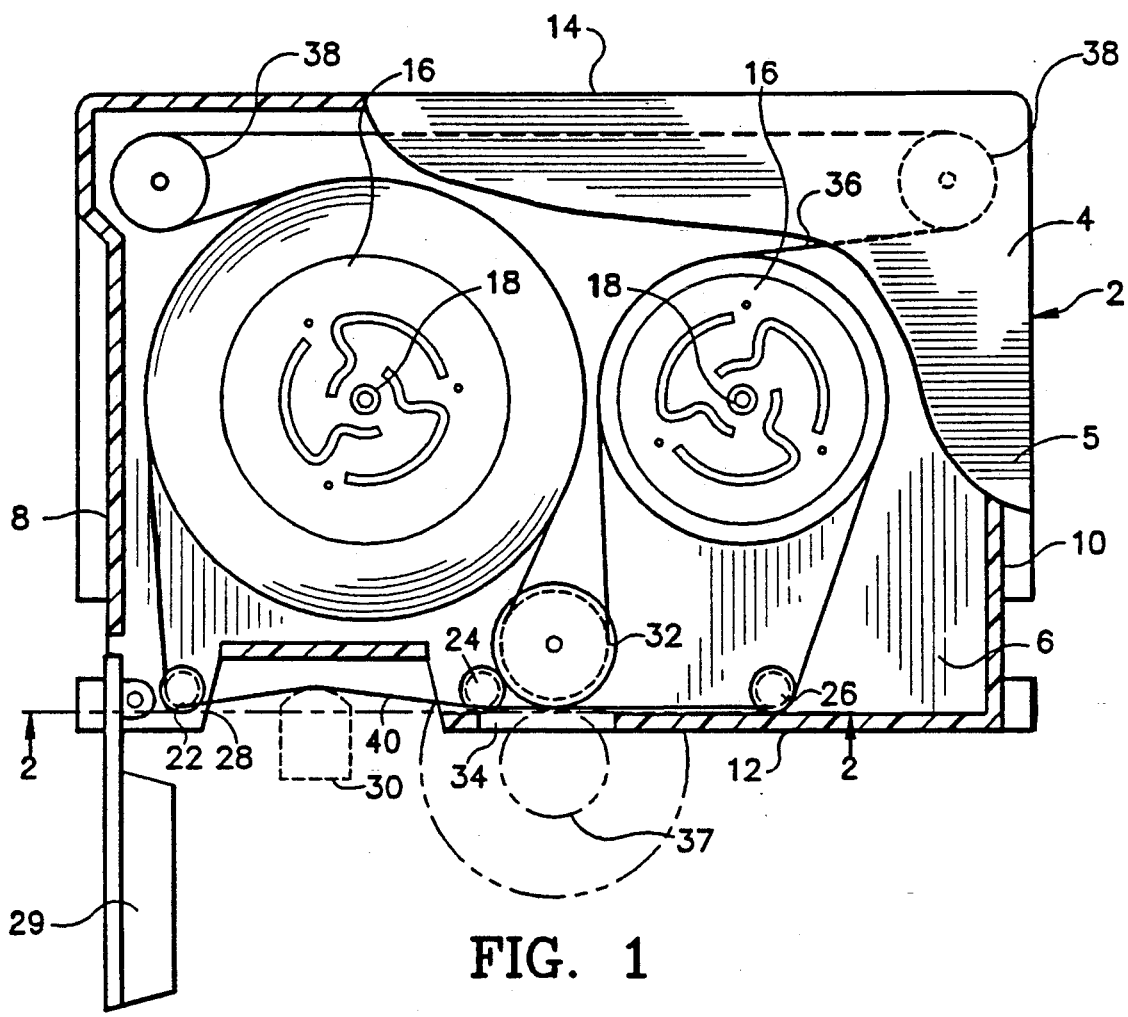
FIG. 1 is a top plan view of a belt driven tape cartridge, partially in section with tape guidance according to the present invention.

FIG. 1 illustrates a data cartridge 2 having the improved tape guide design according to a preferred embodiment of the present invention. The cartridge 2 includes an outer housing 4 for holding various internal tape guiding and transporting components. The housing includes a flat base member or baseplate 6 which is generally made of metal such as aluminum, and a cover member 5 of a transparent, plastic material secured at a predetermined spacing from the baseplate to define a generally rectangular enclosure. Opposite side walls 8 and 10, and front and rear walls 12 and 14, each of which may be formed integrally with the baseplate or cover member, complete the enclosure. In the preferred embodiment illustrated, the side, front and rear walls are all formed integrally with the cover member.

A pair of tape spools 16 are rotatably supported on the upper surface of baseplate 6 by cylindrical pins 18 which are fixed into the baseplate 6 perpendicular to the baseplate and extending a distance that is less than that required to reach the outer housing 4. The upper surface of baseplate 6 defines a reference plane. A magnetic recording tape 40 is wound around the tape spools 16 in opposite directions about their axes. The tape guidance path between the tape spools is defined by three tape guides, 22, 24 and 26.

The cartridge 2 is formed with a cutaway portion 28 along the tape path which provides access to the magnetic tape 40 by a magnetic head 30. The cutaway portion is normally closed by a spring-loaded door 29 which is opened upon insertion of the data cartridge 2 into a tape recorder.

A tape drive mechanism is also mounted in the cartridge and comprises a belt driving roller 32 mounted adjacent to the second opening 34 in the front wall of the housing. A drive belt 36 extends around the driving roller 32 and around belt guide rollers 38 rotatably mounted on a baseplate at the rear corners of the housing so as to contact the tape wound on both spools 16 and frictionally drive the tape and spools. The driving roller 32 is driven via drive roller 37 through the cutaway portions 28 in the front wall of the housing.

Figure 2:
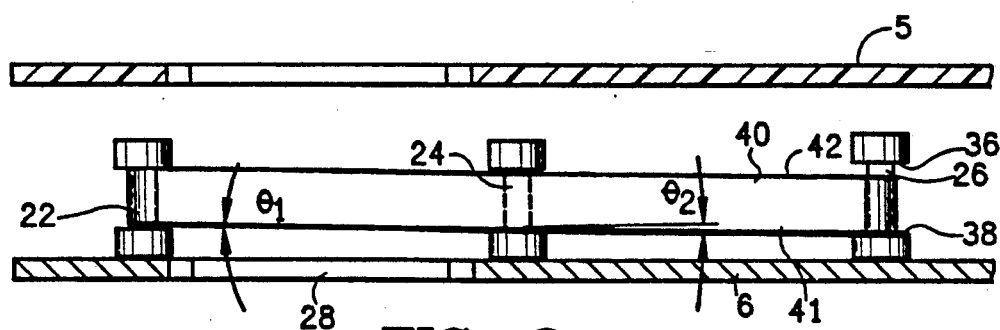
FIG. 2 is a cross-sectional view taken on line 2—2 of FIG. 1.

The tape guidance arrangement of the present invention, shown in FIG. 2, includes three tape guides 22, 24 and 26. The tape guides direct the tape 40 from the spools 16 parallel to the front edge 12 of the cartridge 2 and across the cutaway portion 28 for access by the magnetic head 30. The guidance of the tape parallel to the front edge 12, and thus, against the magnetic head 30, is produced by the guides 22, 24 and 26. While the tape guides 22, 24 and 26 are preferably in the shape of a circular cross-section cylinder, other cross-sectional shapes may be employed such as rectangles or other elongated structures as long as any corners are rounded to prevent contact between the tape 40 and a sharp corner.

In addition to being guided parallel to the front edge 12 of the cartridge 2, the tape 40 must be confined at a constant level above the upper surface of baseplate 6 so that, the tape 40 will not slip up and down (in a direction transverse to tape motion) from one track-to-another when in contact with the magnetic head 30.

Tape guides, while not normally being designed with any intended deviation in perpendicularity, are inserted into the baseplate with a slight deviation from true perpendicular as a natural occurrence of the assembly process, i.e., the vertical alignment of the tape guides is never perfect. Alternately, the tape guides may be designed to be inserted at a slight angle from true perpendicular to the baseplate. This deviation in vertical alignment provides the guidance according to the present invention.

The tape 40 tends toward either the top or the bottom of the tape guide as a function of the tolerance of the assembly or by design, because a tape in motion tends toward the edge of the stationary guidance member which creates the longest tape path. This effect is normally considered to be a negative aspect of a tape guidance system, however the present design takes advantage of it.

For illustration purposes, the tape guides are identified as follows: guide 22 is the main guide, guide 24 is the middle guide, and guide 26 is the auxiliary guide. The magnetic head 30 engages the tape 40 between the main 22 and middle 24 guides and displaces the tape 40 from a straight line path parallel to the front edge 12.

Figure 3:
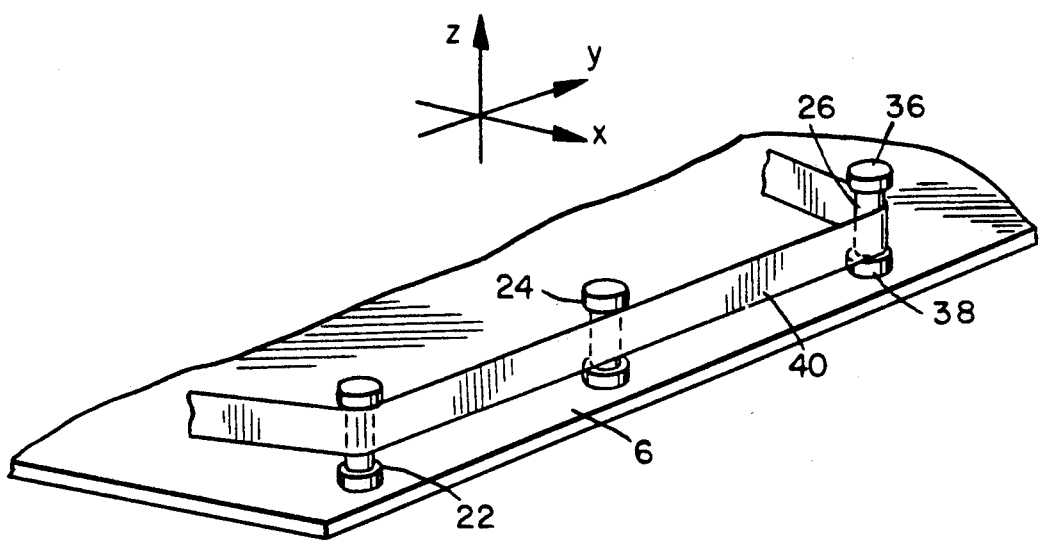
FIG. 3 is a perspective view of a baseplate with references axes.

The tape 40 is in constant contact with the auxiliary guide 26 which has a separation between its upper shoulder 36 and lower shoulder 38 substantially wider than the width of the tape 40 so that the tape edges 41 and 42 cannot simultaneously bear against shoulders 36 and 38. Due to the tendency of the tape 40 to move vertically transverse to the direction of the tape motion (i.e., up or down) when directed by a force that is horizontally transverse to the direction of tape motion, the tape 40 has a preference to run on one shoulder or the other of auxiliary guide 26. To illustrate, an ideal guide which is perfectly perpendicular in the z-direction to the x-y plane of the baseplate 6 would provide a uniform force in the x-direction against the tape 40 which is perfectly perpendicular to the y-z plane of the tape, as shown in FIG. 3. Under this condition, the tape 40 will not preferentially bear against one shoulder or another. The horizontal transverse directing force is provided by the deviation of the tape guide from true parallel to the plane of the tape, either as a result of the manufacturing process or by design. If the auxiliary guide 26 is slanted slightly inward transverse to the y-z plane, i.e., the upper portion of auxiliary guide 26 is offset from the z-axis by some amount (-x) with respect to the lower portion, its lower portion provides the longest tape path so the lower shoulder 38 will bear against the lower tape edge 41. If the auxiliary guide 26 is slanted slightly outward transverse to the y-z plane, i.e., the upper portion of auxiliary guide 26 is offset from the z-axis by some amount (+x) with respect to the lower portion, the upper shoulder 36 will bear against upper edge 42 of tape 40. When the slant of the auxiliary guide 26 is by design, it is known which shoulder the tape will bear against. In this case, only one shoulder will be needed on guide 26, i.e., the one which the tape will bear against; the other shoulder may be omitted.

Since auxiliary guide 26 has a greater width between shoulders 36 and 38, the tape must deviate from a straight line path, in a vertically transverse direction, in order to touch either shoulder. The amount of deviation from the straight line path is sufficient to force the tape 40 to contact alternate shoulders of the main 22 and middle 24 guides. The tape 40 will contact the middle guide 24 on the same shoulder as it contacts the auxiliary guide 26, and it will contact the main guide 22 on the opposite shoulder as it contacts the middle guide 24.

The angle of deviation $\theta_1$ of the tape 40 as it crosses magnetic head 30 is extremely small, typically 41 seconds of arc from true parallelism with respect to an ideal baseplate. The angle of deviation $\theta_2$ between the middle 24 and auxiliary 26 guides is typically less than five to ten minutes of arc from true parallelism to an ideal baseplate.

The tape is always in contact with the same shoulders of the respective pins in a top-top-bottom or bottom-bottom-top pattern when moving from auxiliary guide 26 toward middle guide 24, or from right to left as indicated in FIG. 2. This is true because each tape guide will always be at the same angle off of true perpendicular to the baseplate i.e., will have the same deviation between its upper portion and its lower portion in the x-direction since they are permanently fixed upon insertion into the baseplate. The tape 40 is therefore constrained against relative motion vertically transverse to the travel direction as a result of the contact between the tape and the tape guides.

While the above illustration is explained in terms of data tape cartridge technology, it should be pointed out that the sequential relationship of similar guides for maintaining a constant level transport path with little or no vertical drift is applicable to other forms of tape and web handling systems.

The tape guides according to the present invention provide improved tape guidance over currently available guidance systems. The present tape guidance system makes use of manufacturing tolerances which, in a worse case situation, would place other tape guidance systems outside acceptable ranges. Alternately, the tape guidance system may be intentionally slanted to produce the same effect. Because of the tape's natural tendencies to respond to the transverse forces against it, the tape will always be guided such that it maintains a constant level relative to the parallel data tracks when it is in contact with the magnetic head.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A guidance system for maintaining a magnetic tape within a tape cartridge at a constant level above a baseplate representing an x-y plane in an x, y, z coordinate system during transfer from one spool to another comprising:

at least three guides slightly slanted relative to a perpendicular to said baseplate and bearing against one or both surfaces of said tape where said tape has a tape plane generally parallel to a y-z plane and runs in a y-direction and said at least three guides bear against said tape plane in an x-direction; and at least one enlarged shoulder extending from each guide toward said tape to bear upon an edge of said tape in a z-direction thereby providing a containment force, said shoulders of a first and second of said guides having a spacing equal to or greater than the width of said tape, and a first shoulder and a second shoulder of a third guide of said guides being spaced substantially greater than the spacing of said first and second guides;

wherein said tape bears against said first shoulder of said third guide when an end of said third guide closest to said first shoulder slants outward in a position x-direction with respect to said second shoulder causing said third guide to intersect said y-z plane, said tape bearing against said shoulders of said third and said second guides with the same edge of said tape and said tape bearing against said shoulder of said first guide on the opposite edge of said tape.

2. A guidance system as in claim 1 wherein said guides are cylindrical pins and said shoulders are integrally formed with said cylindrical pins.

3. A guidance system as in claim 1 wherein a magnetic head for reading from and recording on said tape contacts said tape between said first and said second guides.

4. A guidance system as in claim 1 wherein said third guide is slanted off of true perpendicular to said reference plane as a result of manufacturing tolerances.

* * * * *

UNITED STATES PATENT AND TRADEMARK OFFICE
CERTIFICATE OF CORRECTION

PATENT NO. : 5,104,058

DATED : April 14, 1992

INVENTOR(S) : JAMES A. EGGEBEEN

It is certified that error appears in the above-identified patent and that said Letters Patent is hereby corrected as shown below:

Column 6, Line 20 "position" should read --positive--

Signed and Sealed this

Third Day of August, 1993

Attest:

MICHAEL K. KIRK

*Attesting Officer*     *Acting Commissioner of Patents and Trademarks*